United States Patent [19]

Leinen

[11] Patent Number: 4,520,142
[45] Date of Patent: May 28, 1985

[54] AEROSOL APPLICATION OF ENCAPSULATED MATERIALS

[75] Inventor: Roger W. Leinen, Woodbury, Minn.

[73] Assignee: Minnesota Mining and Manufacturing Company, St. Paul, Minn.

[21] Appl. No.: 581,334

[22] Filed: Feb. 17, 1984

[51] Int. Cl.³ .......................... C09D 5/14; C09K 3/30

[52] U.S. Cl. .......................................... 523/205; 264/4; 524/903

[58] Field of Search ........................ 523/205; 524/903; 264/4

[56] References Cited

U.S. PATENT DOCUMENTS

| | | | |
|---|---|---|---|
| 3,516,941 | 6/1970 | Matson | 252/316 |
| 3,623,659 | 11/1971 | Dayton et al. | 239/56 |
| 3,778,383 | 12/1973 | Schibler et al. | 264/4 |
| 3,819,838 | 6/1974 | Smith et al. | 264/4 |
| 3,993,831 | 11/1976 | Vassiliades | 264/4 |
| 4,138,356 | 2/1979 | Vincent et al. | 523/205 |
| 4,186,743 | 2/1980 | Steiger | 128/284 |
| 4,265,797 | 5/1981 | Suk | 524/903 |
| 4,359,543 | 11/1982 | Hegedus et al. | 524/903 |
| 4,391,909 | 7/1983 | Lim | 264/4 |
| 4,407,231 | 10/1983 | Colborn et al. | 264/4 |
| 4,413,069 | 11/1983 | Marshall | 264/4 |
| 4,420,575 | 12/1983 | Rapaport et al. | 524/903 |
| 4,442,194 | 4/1984 | Mikami | 264/4.7 |

*Primary Examiner*—Ronald W. Griffin
*Attorney, Agent, or Firm*—Donald M. Sell; James A. Smith; Mark A. Litman

[57] ABSTRACT

Microencapsulated liquids are applied to substrates from an aerosol applicator. The composition requires selection of solvents, propellants and binders that are not active solvents on the material constituting the capsule shell.

18 Claims, No Drawings

AEROSOL APPLICATION OF ENCAPSULATED MATERIALS

FIELD OF THE INVENTION

This invention relates to microencapsulated materials, compositions useful for providing microencapsulated materials to a surface and the method of applying such compositions. In particular, the present invention relates to microencapsulated materials in a composition useful for aerosol application which is stable under ambient storage conditions.

BACKGROUND OF THE INVENTION

Encapsulated materials have been used for many years in a wide variety of commercial applications. Early uses of encapsulated materials included paper coated with capsules bearing coloring material therein which could be used as a recording medium. U.S. Pat. No. 3,016,308 discloses one of the early efforts using encapsulated material as the image source on recording paper. U.S. Pat. Nos. 4,058,434 and 4,201,404 show other methods of application of encapsulated coloring materials on paper substrates to be used as imaging media and the like. U.S. Pat. No. 3,503,783 shows microcapsules having coloring material therein which are ruptureable by the application of heat, pressure and/or radiation because of a metal coating on the surface of the capsule. These ruptureable microcapsules, in one embodiment, may be secured between a substrate and a photoconductive top coat to enable photosensitive imaging of the system.

A wide variety of processes exist by which microcapsules can be manufactured. These varied processes provide different techniques for producing capsules of varying sizes, alternative materials for the composition of the capsule shell and various different functional materials within the shell. Some of these various processes are shown in U.S. Pat. Nos. 3,516,846; 3,516,941; 3,778,383; 4,087,376; 4,089,802; 4,100,103 and 4,251,386 and British Patent Specification Nos. 1,156,725; 2,041,319 and 2,048,206. A wide variety of different materials may also be used in making the capsule shells. A popular material for shell formation is the polymerization reaction product between urea and formaldehyde or melamine and formaldehyde, or the polycondensation products of monomeric or low molecular weight polymers of dimethylolurea or methylolated urea with aldehydes. A variety of capsule forming materials are disclosed, for example, in U.S. Pat. Nos. 3,516,846 and 4,087,376 and U.K. Patent Specification Nos. 2,006,709 and 2,062,570.

As shown in these references, the principal utility of microencapsulated materials is in the formation of a surface coated with the microcapsules in a binder. The microcapsules are ruptured by various means to release the material contained therein. In addition to release of physically observable materials such as ink in order to form a visible image, other types of active ingredients such as odor releasing materials, bacteriostatic materials, chemically active materials and the like have been provided in this manner.

SUMMARY OF THE INVENTION

The present invention relates to a new composition containing ruptureable microcapsules. The novel composition comprises (1) a microcapsule containing a liquid, (2) a polymeric binder, (3) a solvent for said polymeric binder, and (4) an aerosol propellant. The shell of the microcapsule must be a polymeric material resistant to the solvating action of both the solvent and the propellant. The use of thickening agents in the composition is important where the composition is to be applied to a porous surface.

DETAILED DESCRIPTION OF THE INVENTION

The present invention relates to a composition comprising at least four components comprising (1) microcapsules having a liquid therein, (2) a polymeric binder, (3) a solvent for said polymeric binder, and (4) an aerosol propellant. The capsules in the present invention may comprise any ruptureable capsule containing an active liquid ingredient therein or capsule which is controllably penetrable by the liquid encapsulated therein. The rupture strength of the capsules should be within a range that can endure handling and spraying without rupturing and yet break under forces that can be applied by human fingernails. It has also been found that the size of the capsules plays an important role in the usefulness of capsules according to the practice of the present invention. Generally the capsules must have an average diameter between 12 and 30 microns when the capsule payload is between 50 and 95% percent by weight of the total capsule weight and preferably between 80 and 90% by weight of the total capsule weight. It is highly preferred that the capsules have an average diameter between 14 and 26 microns and it is most preferred that the capsules have a diameter between 15 and 25 microns. These dimensions play an important role in the ability to control the application of capsules in the practice of the present invention. The broadest range of capsule size under any conditions would be about 5 to 75 microns and a more easily sprayed size limit would be between 8 and 50 microns.

The composition of the polymeric material used in the manufacture of the shell is, by itself, not critical. Given the needs of the polymer to be resistant to the solvent action of the solvent for the binder and the propellant, almost any of the many polymeric materials used presently to make capsules can be used. This list includes, but is not limited to, urea-formaldehydes, melamineformaldehydes, phenolformaldehydes, gelatin, poly(vinyl alcohol), poly(vinyl pyrrolidone), polyacrylates, polyamides, polymethacrylates, polyepoxides, and the like.

The nature and composition of the adhesive binder is, by itself, not critical to the practice of the invention as long as the required adhesive properties are met. It is required that the adhesive is soluble in at least one solvent that is not an active solvent for the polymeric material used as the shell of the capsule. Therefore, the shell and the binder may not be the same polymer and usually will differ in their general chemical makeup. It is possible to use polymers from the same general class by making the shell material more resistant to solvents. This can be done, for example, by cross-linking the shell materials. In that manner acrylic or epoxy materials could be used for both the shell and binder by including sufficient amounts of cross-linking agents in the shell material.

Any class of binder including but not limited to polyurethanes, polyacrylates, polyvinyl resins, polyamides, polyesters, polyolefins, polystyrene, allicyclic hydrocarbon resins, rosin esters, pinene resins (and other hydrocarbon resins), starches, gum arabic, gelatin and the like may be readily used in the practice of the present invention. The critical properties are its ability to be solubilized in a solvent not active on the shell material and its ability to bind the shell adhesively as it dries after spraying. Materials generally known in the art as film-forming resins are useful as are other adhesive materials.

The solvent must be a solvent for the binder and not be an active solvent for the material which forms the structure of the shell. The terms "not an active solvent" and "resistant to the solvating action" used in describing the relationship of properties of materials in the practice of the present invention are defined in terms of specific properties. An active solvent for the shell material is one that would either (1) dissolve more than 10% by weight of the shell material at room temperature over a time period of thirty days, or (2) permeate through the shell material at a rate such that after thirty days at room temperature, more than 20% of a liquid within the shell (capable of passing through the shell) would comprise the solvent. Preferably less than 5% (and most preferably 0%) by weight of the shell would be dissolved in that time frame and less than 10% (and most preferably less than 5% or 0%) would be present as the liquid component within the shell. Most of the well known solvents can be used with a proper balance in the selection of the shell material and the binder. For example, hydrocarbon solvents such as pentane, hexane, heptane, octane and nonane are useful, as are 1,1,2-trichlorotrifluoroethane, tetrahydrofuran, methylethyl ketone, methylisobutyl ketone, water, methanol, isobutylene, the phthalates, and the like. Rapidly drying solvents (i.e., at least 90% by weight evaporation from a one micrometer film of the solvent in twenty seconds at 25° C.) are preferred. The solvent must be selected, of course, on the basis of its solvent activity towards the binder (for which it must be a good solvent) and towards the shell (for which it must not be an active solvent). It is not desirable for the solvent to be able to swell the capsule shell material by more than 15% by volume after 30 days at 20° C. The swelling tends to cause the encapsulated liquid to be removed, particularly if the solvent is a solvent or partial solvent for the liquid. This affect can be reduced by loading the exterior components with the liquid (to balance the mass transfer equilibirum) or selecting a swelling solvent which is not a solvent for the liquid. Examples of considerations given in selecting components in such a swellable system are outlined below.

A dry urea-formaldehyde shell wall capsule containing cyclohexane plus several dithioxamide derivatives (i.e., compounds which combine with nickel ions to give colored species) when placed in a fresh water dispersion does not lose significant cyclohexane nor dye precursors even though water appreciably swells the urea-formaldehyde resin walls. This is because water is not a good solvent for urea-formaldehyde nor for the capsule interior phase. Very little of the urea-formaldehyde resin dissolves in the water phase (i.e., much less than 0.5%).

The same capsules placed into anhydrous ethanol or 95:5 ethanol:water will rapidly lose large quantities of both the dye precursors and the cyclohexane. Ethanol is not an active solvent in the sense that it dissolves urea-formaldehyde, but it does appreciably swell the wall. It is at the same time, however, a good solvent for the capsule interior.

The outside solvent is even more critical in the case of capsules designed to have "controllable penetrability" (i.e., sustained release). In this situation, solvents with no significant ability to either dissolve nor to swell the polymer used for the shell wall still may give significant loss of capsule contents if they are solvents for the capsule interior. In this situation the capsule interior is in itself a swelling agent for the shell wall (by design to achieve diffusion based on sustained release as in the polyurea capsules used for Sectrol ®). The same dry urea-formaldehyde capsules shown above, when placed in a cyclohexane solvent, will retain their fill contents indefinitely. The cyclohexane is neither an active solvent nor a swelling solvent for the capsule shell wall, so that diffusion across the wall is minimal even though the exterior solvent is an excellent solvent for the capsule interior.

The selection of the aerosol propellant is also based not only on its ability as a propellant, but also on the basis of its properties as a solvent. The propellant must not be an active solvent for the shell-forming materials. It is preferably miscible in the solvent. If it is not completely miscible in the solvent there would be an increasing degree of inefficiency or inconsistency in the composition of the material released from the aerosol container. This would develop from a separation between solvent and propellant which might also lead to separation of other ingredients. For example, a good combination of solvents and propellants would be pentane and isobutane, hexane and propane, heptane and isobutane/propane, pentane/octane and isobutane/propane, 1,1,2-trichlorotrifluoroethane and chlorodifluoromethane, water and carbon dioxide, and the like. Propellant materials are generally well known in the art and comprise materials which under pressures greater than 1.25 atmospheres at room temperature remain dissolved in a liquid carrier (such as the solvent of the present invention) and when exposed to atmospheric pressure at room temperature rapidly volatilize into a gas. These materials are well known in the art and include, but are not limited to, aliphatic hydrocarbons such as butane, isobutane, propane, low molecular weight halogenated hydrocarbons (preferably chlorinated and/or fluorinated hydrocarbons) such as chlorodifluoromethane, dissolvable gases such as carbon dioxide, and other materials well known in the art.

The thickening agents used in the preferred compositions of the present invention must, of course, be compatible with the solvent and binder systems. For example, highly polar thickening agents would not be likely candidates for use with non-polar solvents since they would not necessarily act as thickeners. Conversely, non-polar thickeners would not be good candidates for polar solvents. Useful thickeners include, but are not limited to, the following materials: fatty acids with appropriate polar or non-polar groups (e.g., fatty acids, fatty acid glycerides, fatty acid sulfonates), long chain quaternary ammonium salts (e.g., quaternary ammonium salt of colloidal cellulose sulfate, tetradodecyl ammonium para-toluene sulfonate), active silica particles, partially soluble acrylic particles (e.g., those which swell in solvents, including water), corn starch and the like.

As previously noted, it is the selection of the individual materials based on their relative physical properties that is most critical to the present invention. The materials cannot be selected randomly on the basis of their individual properties, but must be viewed collectively.

Good systems for use with encapsulated liquids that are not active solvents for the shell material would include the following:

TABLE

| MATERIAL | SYSTEM I | SYSTEM II | SYSTEM III |
|---|---|---|---|
| Shell | urea formaldehyde | polymethyl-methacrylate | poly(vinyl alcohol) |
| Binder | allicylic, petroleum based hydrocarbon resin | poly(vinyl alcohol) | poly(ethylene-terephthalate) |
| Solvent | n-pentane | water | methylethyl ketone |
| Propellant | isobutane/propane | carbon dioxide | chlorodifluoromethane |

The aerosol compositions of the present invention have many different areas of utility. Where sustained release of fragrances is desired, the composition can be sprayed onto areas where there will be occasional frictional or abrasive contact with the applied coating. For example, the composition may be sprayed onto apparel, car seats, cushions, walk mats and other surfaces from which it would be desirable to release fragrances on an occasional basis. Where the encapsulated material has a more active function, such as dog or rabbit repellant, fungicide, carpet freshener, antistatic agents, and the like, the compositions can also be placed in appropriate areas such as bath mats in locker rooms (for fungicides and fresheners), around shrubs (for repellants and insecticides), and on carpets (for antistatic agents and fresheners).

The proportions of materials in the composition may vary over a broad range. A general preferred range of proportions would be:
 (a) microcapsules, 0.1–15%
 (b) binder, 1–30%
 (c) solvent, 35–95%
 (d) propellant, 2–60%.
A more preferred range of proportions would be
 (a) microcapsules, 1–12%
 (b) binder, 3–25%
 (c) solvent, 45–90%
 (d) propellant, 3–50%.

In another aspect of the invention, microcapsules having differing rupture strengths with the same encapsulated liquid may be used. By having capsule shells that differ in strength by at least 25%, different forces are required to break the shells and they would tend to release material over a longer period of time.

In one aspect of the present invention, the encapsulated liquid need not be kept in a shell to which it is completely impermeable. In a number of uses, the liquid ingredient may desirably be controllably permeable through the shell. This construction of capsules is, by itself, well known in the art of time release capsules used for medications, plant foods, insecticides and the like. Because the external components of the aerosol composition (the binder, solvent and propellant) are not readily penetrable into the shell, the major portion of such controllably released liquids would remain in the shell even after months of storage. In order to further reduce any tendency towards migration of the active liquid into the external components, some amount of the liquid could be included in that portion of the composition. This would have two beneficial effects. An immediate dose of the liquid ingredient would be provided for use and the driving force for release of the liquid into the external composition would be reduced.

The capsules may contain a wide variety of active materials therein. The most preferred types of ingredients would be fragrant materials or materials which provide chemically active vapors or liquids. These may or may not also be colored.

These and other aspects of the invention will be shown in the following, non-limiting examples.

EXAMPLES 1–12

Four separate samples of capsules were made according to the teachings of U.S. Pat. No. 3,516,941 with urea-formaldehyde as the binder resin. Each batch of capsules used different liquid oils as fragrant materials. The four oils had fragrances of leather, rose, mint and pine, respectively. Three compositions of each aerosol appliable dispersion were made with differing proportions of each type of capsule.

The compositions with each of the four capsules were as follows:

| | | Premix | | |
|---|---|---|---|---|
| | | A | B | C |
| Binder | Arkon TM P-115, transparent allicyclic hydrocarbon resin, petroleum is used | 50 | 50 | 50 |
| Solvent | hexane | 490.5 | 490.5 | 490.5 |
| Thickeners | fatty acid glyceride and quaternary ammonium salt of colloidal cellulose sulfate | 9.5 | 9.5 | 9.5 |
| Capsules | | 25 | 37.5 | 50 |

The various premix compositions were charged into 6 fluid ounce aerosol cans fitted with conventional valves and actuators. The cans were charged with 60 parts premix, 30 parts isobutane and 15 parts propane by weight. All compositions sprayed evenly onto polyester/cotton fabric and formed a coating containing rupturable microcapsules in a binder.

EXAMPLE 13

A non-flammable composition was also prepared as follows:

| | | Premix |
|---|---|---|
| Binder | Arkon TM P-85, transparent allicyclic hydrocarbon resin, petroleum derived | 50 |
| Solvent | Trichlorotrifluoroethane | 1125 |
| Thickeners | Fatty acid glyceride and quaternary ammonium salt of colloidal cellulose sulfate | 9.5 |
| Capsules | | 50 |

This premix composition was charged into a 6 fluid ounce aerosol can fitted with a conventional valve and actuator using 125 parts premix and 40 parts chlorodifluoromethane by weight. The composition sprayed evenly onto polyester/cotton fabric and formed a coating containing rupturable microcapsules in a binder.

I claim:
1. An appliable composition comprising

(a) microcapsules having an average diameter between 5 and 75 microns containing a liquid within a shell,
(b) a film forming binder,
(c) a solvent for said film forming binder which is not an active solvent for the material comprising the shell of said microcapsule, and
(d) a propellant which is miscible with said solvent and which is not an active solvent for the material comprising the shell of said microcapsule.

2. The composition of claim 1 wherein a thickening agent which is compatible with said solvent is also present in the composition.

3. The composition of claim 1 wherein the relative parts by weight of the components are
(a) microcapsules, 0.1–15%
(b) binder, 1–30%
(c) solvent, 35–95% and
(d) propellant, 2–60%.

4. The composition of claim 2 wherein the relative parts by weight of the components are
(a) microcapsules, 0.1–15%
(b) binder, 1–30%
(c) solvent, 35–95%
(d) propellant, 2–60% and
(e) thickener, 0.25–8%.

5. The composition of claim 1 wherein the relative parts by weight of the components are
(a) microcapsules, 1–12%
(b) binder, 3–25%
(c) solvent, 45–90% and
(d) propellant, 3–50%.

6. The composition of claim 2 wherein the relative parts by weight of the components are
(a) microcapsules, 1–12%
(b) binder, 3–25%
(c) solvent, 45–90%
(d) propellant, 3–50% and
(e) thickener, 0.25–8%.

7. The composition of claim 1 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

8. The composition of claim 2 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

9. An aerosol can containing the composition of claim 1.

10. An aerosol can containing the composition of claim 2.

11. An aerosol can containing the composition of claim 3.

12. An aerosol can containing the composition of claim 4.

13. An aerosol can containing the composition of claim 5.

14. An aerosol can containing the composition of claim 6.

15. An aerosol can according to claim 9 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

16. An aerosol can according to claim 10 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

17. An aerosol can according to claim 11 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

18. An aerosol can according to claim 12 wherein the microcapsules have a shell of urea formaldehyde, the binder comprises an allicyclic, petroleum-based hydrocarbon resin, the solvent comprises an aliphatic hydrocarbon selected from the group consisting of pentane, hexane, heptane, and octane, and the propellant is an aliphatic hydrocarbon selected from the group consisting of butane, isobutane, and propane or a low molecular weight halogenated hydrocarbon.

* * * * *